United States Patent [19]

Nolf

[11] Patent Number: 5,451,278
[45] Date of Patent: Sep. 19, 1995

[54] ENVIRONMENTAL PROTECTION

[75] Inventor: Jean M. E. Nolf, Korbeek, Belgium

[73] Assignee: N.V. Raychem S.A., Kessel, Belgium

[21] Appl. No.: 133,003

[22] PCT Filed: Apr. 1, 1992

[86] PCT No.: PCT/GB92/00578

§ 371 Date: Oct. 6, 1993

§ 102(e) Date: Oct. 6, 1993

[87] PCT Pub. No.: WO92/17928

PCT Pub. Date: Oct. 15, 1992

[30] Foreign Application Priority Data

Apr. 8, 1991 [GB] United Kingdom ................ 9107377

[51] Int. Cl.$^6$ .............................................. H01R 4/72
[52] U.S. Cl. ....................................... 156/52; 156/86;
439/730; 428/34.9
[58] Field of Search ................ 156/47, 49, 51, 52,
156/53, 84, 85, 86, 304.6; 428/34.9; 29/447;
439/730, 932

[56] References Cited

U.S. PATENT DOCUMENTS

| | | | |
|---|---|---|---|
| 3,708,611 | 1/1973 | Dinger | 439/730 X |
| 4,287,012 | 9/1981 | Midgley et al. | 428/34.9 X |
| 4,289,553 | 9/1981 | Nolf | 428/34.9 X |
| 4,323,607 | 4/1982 | Nishimura et al. | 439/932 X |
| 4,743,321 | 5/1988 | Soni et al. | 156/86 X |
| 4,775,501 | 10/1988 | Rosenzweig et al. | 156/86 X |
| 4,865,892 | 9/1989 | Winfield et al. | 156/86 X |
| 4,921,648 | 5/1990 | Soni et al. | 156/86 X |
| 4,950,343 | 8/1990 | Shimirak et al. | 156/86 X |

Primary Examiner—Michael W. Ball
Assistant Examiner—Francis J. Lorin
Attorney, Agent, or Firm—Herbert G. Burkard; William D. Zahrt, II; A. Stephen Zavell

[57] ABSTRACT

A method of protecting a substrate, which comprises:
(a) providing an article having a first portion that has means allowing that portion to be deformed from a larger cross-sectional size to a smaller cross-sectional size and maintained at that smaller size, and that comprises a heat-shrinkable material,
(b) positioning the article such that a first portion encloses at least a part of the substrate,
(c) deforming the first portion to the smaller cross-sectional size at which it corresponds closely to the part of the substrate, and
(d) heat-shrinking the material to cause the first portion of the article to engage the substrate.

25 Claims, 7 Drawing Sheets

PRIOR ART

PRIOR ART

PRIOR ART

ENVIRONMENTAL PROTECTION

BACKGROUND OF THE INVENTION

The present invention relates to the environmental protection of substrates such as cables or pipes, particularly telecommunications cable splices especially by means that does not require a large input of energy for installation.

A cable splice is in general formed by removing insulation from the ends of the cables to be joined, splicing the conductors therein, and forming around the resulting splice bundle a covering called a splice case, in order to protect the otherwise exposed conductors. The splice case may be required to offer protection against water, water vapour, dirt and other contaminants and against animal attack, and should have a life-time comparable to that of the cable insulation, typically at least 25 years. Many cables are internally pressurized to keep out water vapour or to provide a means of detecting leaks, and a splice case for such cables should also be pressure retaining.

One of the most successful and widely used designs of cable splice is that marketed by Raychem under the trade marks XAGA and VASM. There a heat-shrinkable sleeve is installed around the splice to be protected, and heat is applied to cause it to shrink down into engagement with the cables either side of the splice. A propane torch is usually used to apply the heat. In order to provide further mechanical strength and, where desired to provide further resistance to water vapour penetration, an internal liner may be provided around the splice bundle. Such a liner and sleeve are disclosed in GB 1431167 (Raychem). These sleeves may be internally-coated with a hot-melt adhesive.

Whilst this type of splice case is simple to install and has excellent performance, it has the disadvantage in requiring the use of a torch for installation. Where a cable to be spliced runs in, for example, a duct or manhole shared with gas pipes or where the substrate to be protected is itself a gas pipe the use of a torch is undesirable and may be forbidden.

Attempts have been made to overcome this problem by providing an electrical source of heat, although that too may be unacceptable if the voltage required is sufficiently high that a short could cause sparking. Also, large, heavy, power supplies may be needed since access to mains power cannot be relied upon. A large amount of power is required since the sleeve must be heated to cause it to shrink, and any adhesive coating has to be heated to cause it to melt or otherwise to be activated.

One electrical solution is disclosed in DE 2136739 (Siemens AG). There a splice case comprises two semi-cylindrical thermoplastic half-shells hinged together along respective edges, allowing the splice case to be closed like a clam-shell around the splice to be protected.

U.S. Pat. No. 4,085,286 (Raychem) discloses a splice case having preformed shrinkable outlets having self-contained electrical heaters comprising a conductive polymer having a positive temperature coefficient of resistance (PTC). A PTC heater as part of a shrinkable sleeve is disclosed in EP 0117762 (Raychem).

EP 0236056 (Raychem) discloses a non-shrinkable splice case comprising a flexible sealing bag that is seam-sealed by a hot-melt adhesive activated by a self-contained, self-regulating, strip heater.

Heat shrinkage is desirable, of course, since a sleeve or other protective article can easily be installed around a cable etc. since it can be supplied over-size. Close tolerances in manufacture can be avoided, and a single size of article can be used over various sizes of cables. After this preliminary installation the article is heat-shrunk causing it to engage the substrate and causing leak paths between it and the substrate to be eliminated. This is particularly useful where an outlet of an article is to be sealed to a cable etc. that passes through it. A problem arises, however, if the heater that is used to bring about heat-shrinkage is other than a flame, a hot-air gun, or a very high temperature radiative heater; and this problem is due to the changing dimension of the shrinking article. Somehow the heater must follow the article down as it shrinks since contact between the heater and the article will in general be necessary.

For this to occur the heater must be flexible and in particular must be able to shrink or be able to collapse under the force of the shrinking article. A heater having diamond shaped slots for this latter purpose is disclosed in U.S. Pat. No. 4,177,446 (Raychem). EP 0117762 (Raychem), mentioned above, employs a heater which itself shrinks.

I have noticed a further problem resulting from shrinkage of the article. One reason a large supply of heat is required is that the article will not in general be thermally-insulated, it being difficult to provide an insulating housing that shrinks along with the sleeve.

Furthermore, I have realized that it is possible to retain the benefits of heat-shrinkage, but avoid the disadvantages of what may be termed a "bulk" or "large-scale" change of dimension. Thus, a heater and an insulating housing may be provided that do not change size and which, with a small amount of power, cause localized shrinkage of an article which before shrinkage has a configuration which corresponds closely to that of the substrate to be protected.

SUMMARY OF THE INVENTION

Thus, the invention provides a method of protecting a substrate such as a cable splice, which comprises:
 (a) providing an article such as a sleeve, particularly a wraparound sleeve, having a first portion (for example an end portion or other outlet) that has means, preferably corrugations particularly extending longitudinally of the sleeve, allowing that portion to be deformed from a larger cross-sectional size to a smaller cross-sectional size and maintained at that smaller size, and that comprises a heat-shrinkable material,
 (b) positioning the article such that the first portion encloses at least a part of the substrate,
 (c) deforming (preferably by bunching together corrugations thereof) the first portion to the smaller cross-sectional size at which it corresponds closely to the part of the substrate,
 (d) heat shrinking the material to cause the first part to engage the substrate,
 (e) optionally positioning an electrical heater in thermal contact with the heat-shrinkable material and activating the heater to cause the heat-shrinkage of the step (d), and
 (f) optionally and generally before step (d) enclosing the first portion within a heat insulator.

When I refer to the first part being deformed such that its size corresponds closely to that of the substrate, I mean that a significant part and preferably a majority of the change in dimension required is brought about in that way, thereby reducing the change that is required during the heat-shrinking step. Preferably, however, substantially all of the bulk dimensional change is brought about that way. Where the first part is corrugated (by which term I include the provision of means such as lines of weakness to aid subsequent corrugation at step c), the troughs of the corrugations will, after step c, touch the substrate. Thus, although the material may still be shrinkable by its full amount, that shrinkage will not result in a change in diameter or whatever of the article. The effect of shrinkage will, in general, be to remove the corrugations, thereby removing any leak paths that would otherwise exist through them.

A sealing material, such as a hot-melt adhesive, or otherwise heat-activatable material, may be provided between the substrate and the article. Such a material may be provided as a coating on the article and/or as a separate article, for example in sheet form, particularly as a tape wrap.

Also or alternatively, a heater, particularly an electrical heater may be provided which too is preferably positioned between the article and the substrate. The heater is also preferably in sheet form, particularly as a tape wrap, and may be provided as part of the same article as the sealing material. The heater may comprise a battery, which may generate heat through its internal resistance and/or through an external resistive heating element.

Such a heating article may be used independently of the method defined above, and the invention therefore also provides an article for protecting a substrate (either on its own, or by facilitating the installation of some other article) which comprises a flexible sheet comprising:
 (a) a battery, preferably an alkali-metal battery, such as one based on lithium.
 (b) a heat activatable sealing material,
 (c) a resistive heating element, which may comprise the internal resistance of the battery,
 (d) means whereby the battery can be electrically connected to the heating element to cause the heating element to become hot,
 (e) optionally a device, which may comprise element (c), having a positive temperature coefficient of resistance connected in series with the battery and in thermal contact with the element (c), Step (c) of the method preferably brings the first portion of the article down onto the heating article that has previously been wrapped around the substrate. Then, an insulating housing made for example of foam, optionally as foam half-shells, is placed around the deformed first portion and held in place for example with tie wraps. The heater is then activated causing the sealing material to become activated and the material of the first portion to shrink.

The means in the article of the method allowing deformation preferably allows the formation of a substantially frusto-conical portion at or adjacent one or each end of the sleeve, said substantially frusto-conical portion being formed in step (c).

Preferably, that means allows formation of a substantially frusto-conical portion adjacent one or each end of the sleeve, and tapering towards that end, and a substantially cylindrical portion between that end and the narrow end of the frustum, said substantially frusto-conical and cylindrical portions being formed in step (c).

The means allowing deformation may comprise corrugations (by which term we include lines of weakness or other means through which corrugations arise when the article is deformed). Thus, deformation may give rise to corrugations proper, or may merely cause existing corrugations to bunch-up, and thus adopt a certain size.

BRIEF DESCRIPTION OF THE DRAWINGS

The invention is further illustrated with reference to the accompanying drawings, in which.

DESCRIPTION OF THE PREFERRED EMBODIMENT

Figure 1A:
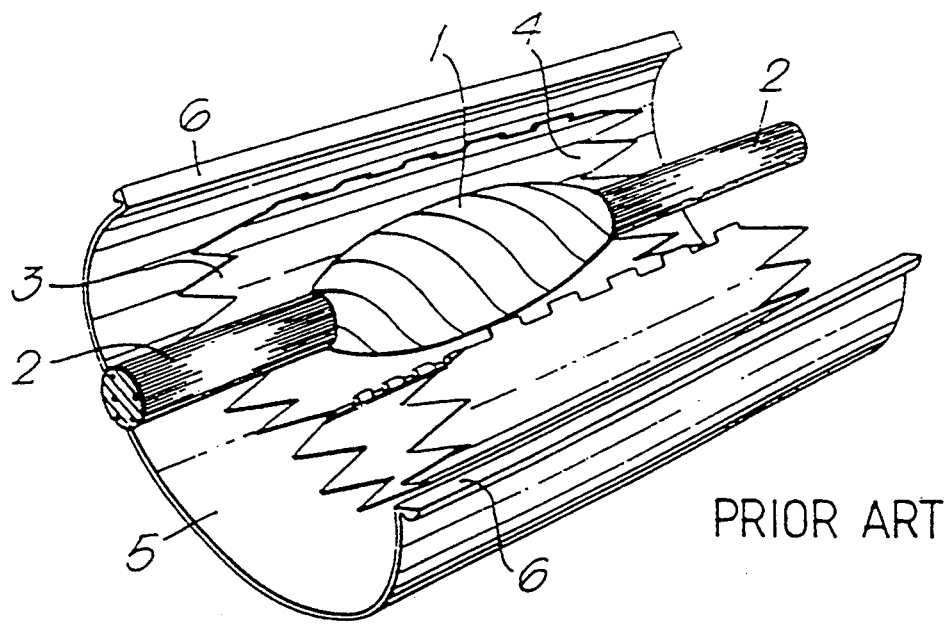
FIGS. 1A and 1B show a conventional prior art, heat-shrinkable sleeve around a cable splice.
Figure 1B:
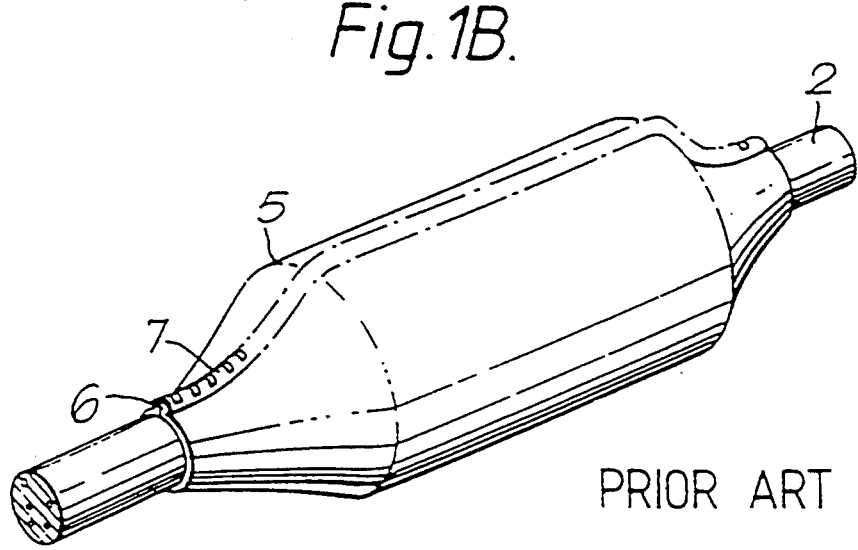
Figure 2A:
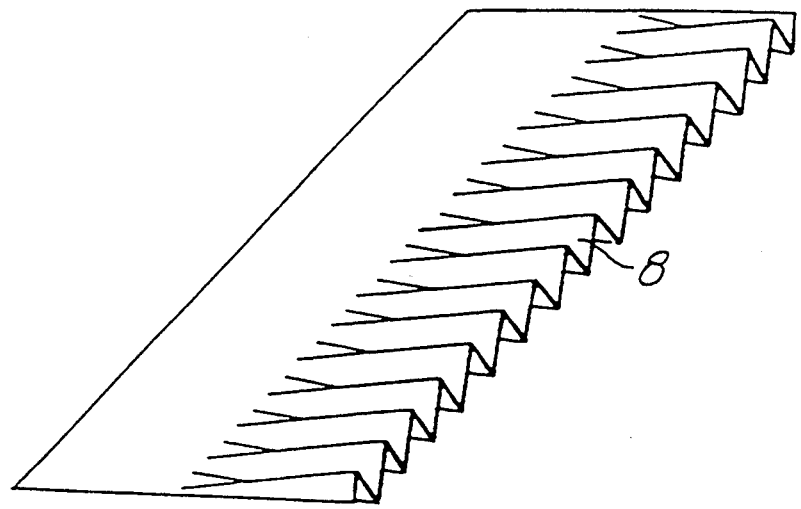
FIGS. 2A and 2B show a prior art shrinkable corrugated tape for environmental sealing.
Figure 2B:
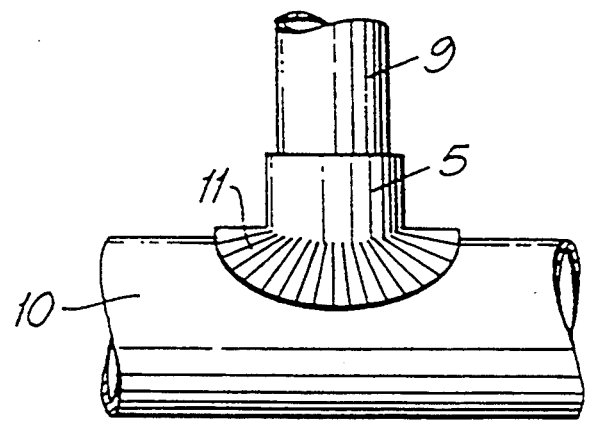

FIGS. 1A and 1B show the most widely used shrinkable telecommunications cable splice cases, namely those marketed under the Raychem trademarks XAGA and VASM. A cable splice 1, which may be quite bulky due to a large number of conductor connectors, joins two cables 2. A liner 3 is wrapped around the splice in order to provide further protection. The liner 3 may have crowned ends which can be deformed to provide frusto-conical ends to the liner. The splice case is completed by a heat-shrinkable polymeric sleeve 5 that is wrapped-around the liner and secured in its wrapped-around configuration by bring together rails 6 and sliding over them channel 7. The sleeve is then shrunk by applying heat, generally using a propane torch, such that it engages the liner and the cables at each side of the splice. The finished splice case is shown in FIG. 2B.

The corrugated material shown in FIGS. 2A, 2B and 3A, 3B is disclosed in EP 42262 (Raychem). Shrinkability is induced into a material by a first expansion which is unidirectional but uniform and then by a second expansion which produces corrugations 8, which may increase in extent across the surface of the material. The material can be used to cover pipe branch-offs or splice cases. The material is wrapped to form a sleeve 5 around a branch pipe 9 in order to seal its junction with a main pipe 10. The corrugated region is then splayed out to form a collar 11 which can overlie a hole in the main conduit.

Figure 3A:
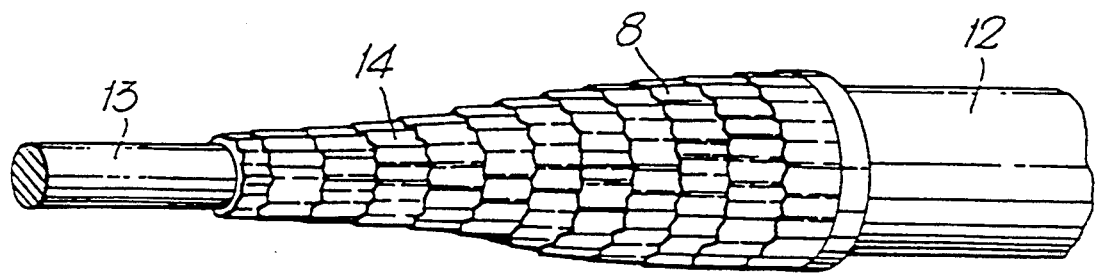
FIGS. 3A and 3B show a prior art shrinkable corrugated tape for environmental sealing.
Figure 3B:
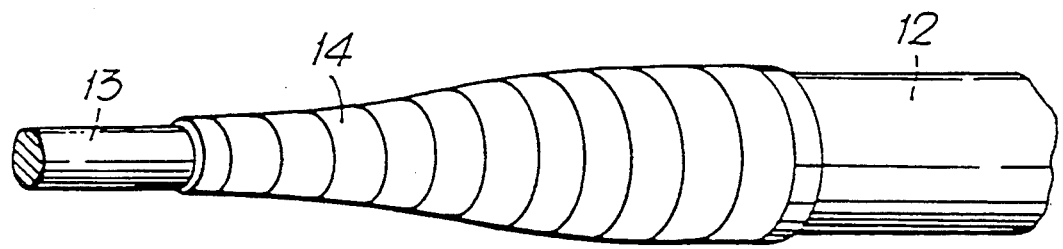

FIGS. 3A and 3B show a substrate having a transition from a larger diameter at 12 to a smaller diameter at 13. A tape 14 having corrugations 8 is wrapped around the substrate and then heated. FIG. 3B shows the smooth cover that results after installation.

The invention is illustrated in FIGS. 4, 5 and 6.

Figure 4A:
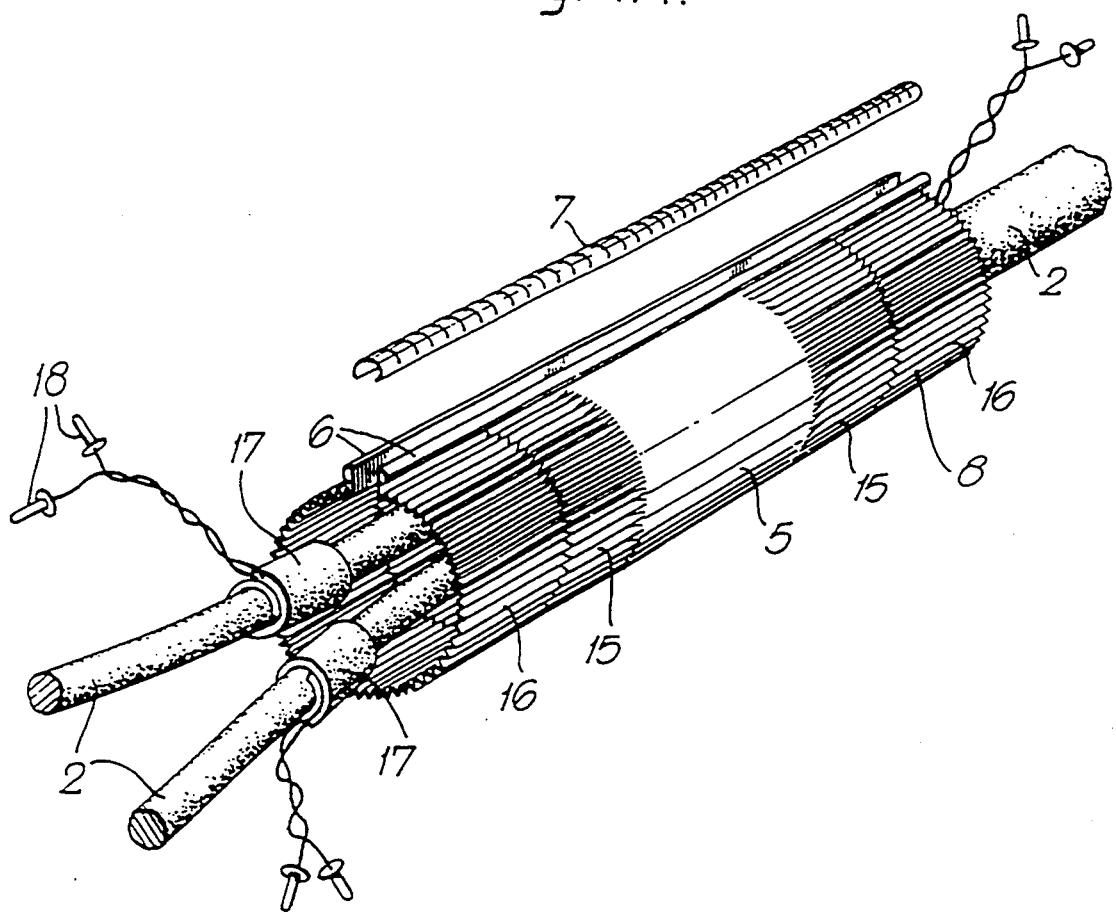
FIGS. 4A, 4B and 4C show the installation of a sleeve by the method of the invention.
Figure 4B:
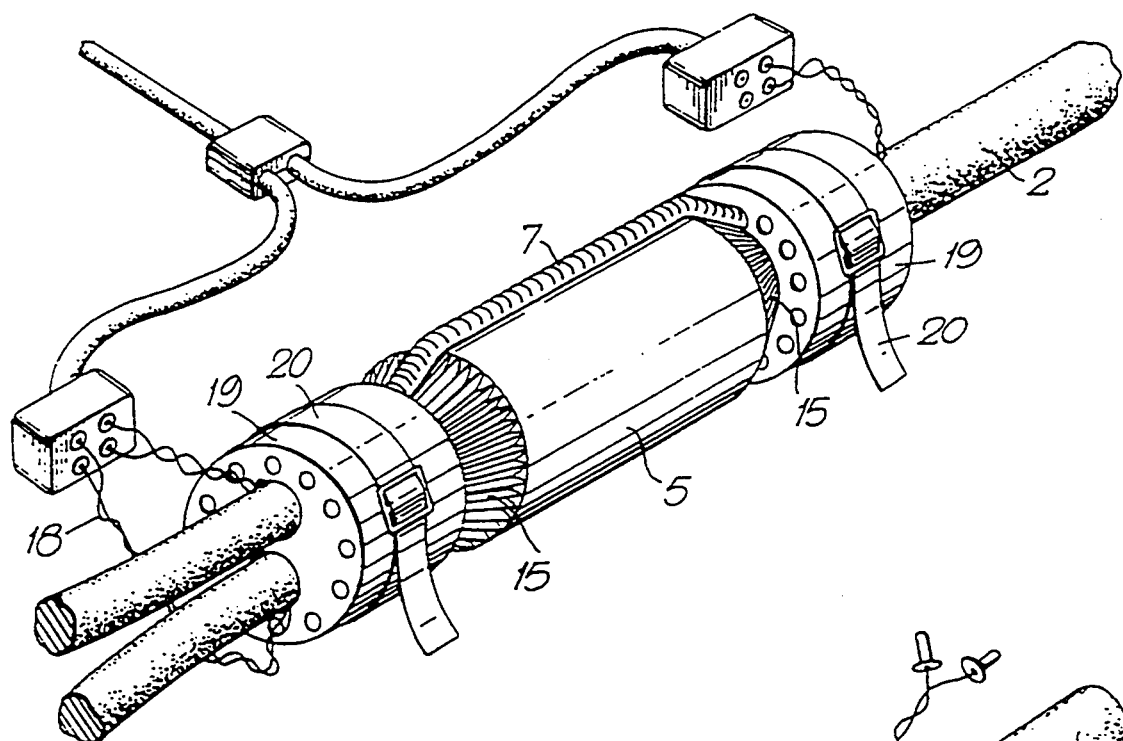
Figure 4C:
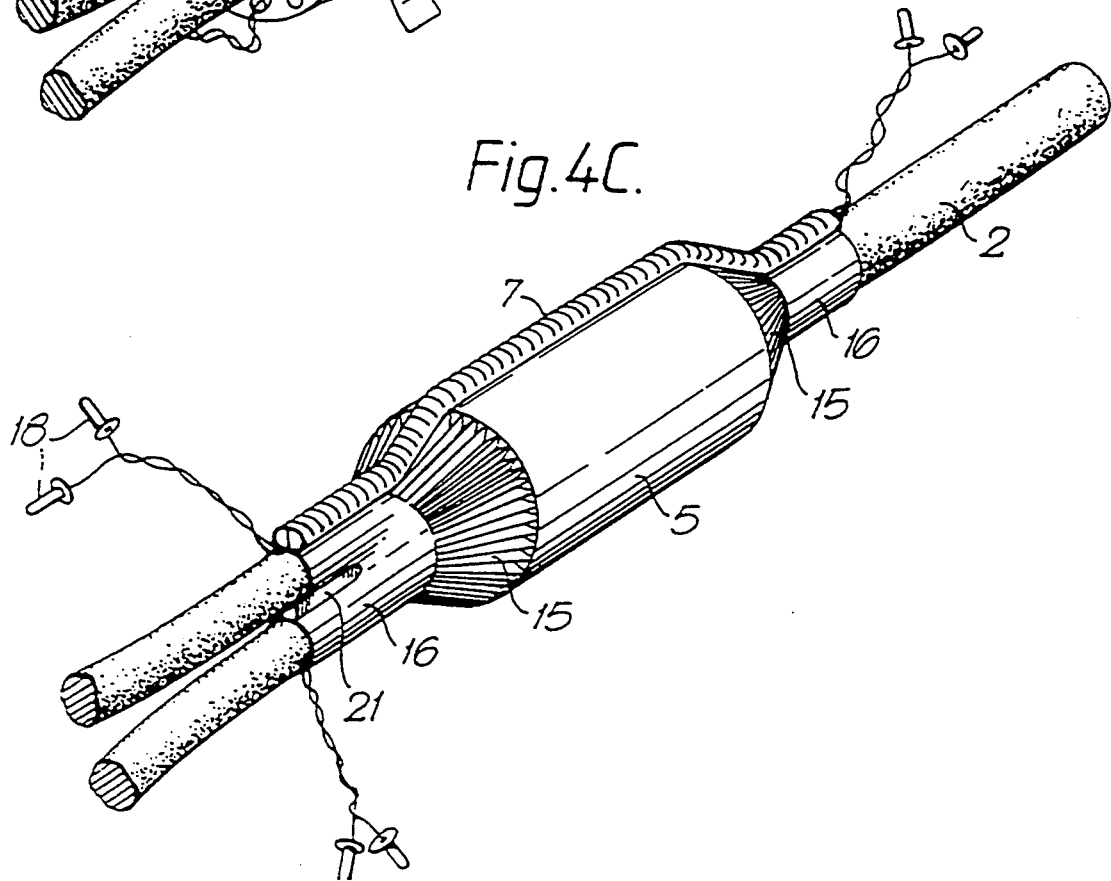

FIGS. 4A, 4B and 4C show various stages in the installation of a heat-shrinkable sleeve 5 around a splice between cables 2 to form a splice case.

In FIG. 4A the sleeve 5 has been wrapped around the splice and the rails 6 are about to be secured together with channel 7. Some sealing material, for example a gel, may be used to improve sealing between the rails 6.

End portions of the sleeve have corrugations 8 therein, and in the embodiment illustrated the corrugations are provided in two portions 15 and 16 at each end, optionally separated by some form of discontinuity. When the ends of the sleeve are deformed by radial compression (for example by hand) frusto-conical portions will be formed corresponding to portions 15 and cylindrical portions will be formed corresponding to portions 16. The frusto-conical portions will produce a taper down from the bulky splice to the cables 2, and the cylindrical portions will lie along the cable or cables 2. Thus, the end portions of the sleeve can be made to conform closely to the size of the cables.

Before the deformation is carried out, however, tape wraps 17 are installed around the cables. These tape wraps may comprise one or more of a battery, a heating element, and a sealing material. Electrical leads 18 are shown by means of which a battery within wrap 17 can be activated, or by means of which an external power source can be connected to a heating element within wrap 17.

After deformation of the portions 15 and 16 down onto the wraps 17, a thermal housing 19 may be applied and secured with tie wraps 20.

This is the situation shown in FIG. 4B. FIG. 4B also shows further electrical leads whereby leads 18 are connected to an external power supply, which supplies power to cause heat-shrinkage of the regions 16. A portion of the sleeve between portions 15 (or that portion together with at least part of portions 15) is preferably not heat-shrinkable.

After shrinkage is complete the thermal insulation may be removed. The result is shown in FIG. 4C, where the corrugations can be seen to have been removed from portions 16. Also shown in FIG. 4C is a branch-off clip 21 which has been used to form or maintain a plurality of conduits in an end portion of the sleeve 5. An excellent hot-melt bond can thus be made between the sleeve 5 and the cables 2 with very little electrical power. For typical splice case sizes a more than adequate power output of a battery within each tie wrap 17 would be 5-30 watt hours, particularly 10-20, say about 15 watt hours. I prefer that a current of 5-35, especially 10-20 particularly about 20 amps be delivered to a PTC heating element within the wrap which autotherms to maintain the temperature between 110° and 130° C. An installation of time of less than 10 minutes, probably about 7 minutes, may be readily achieved.

Figure 5A:
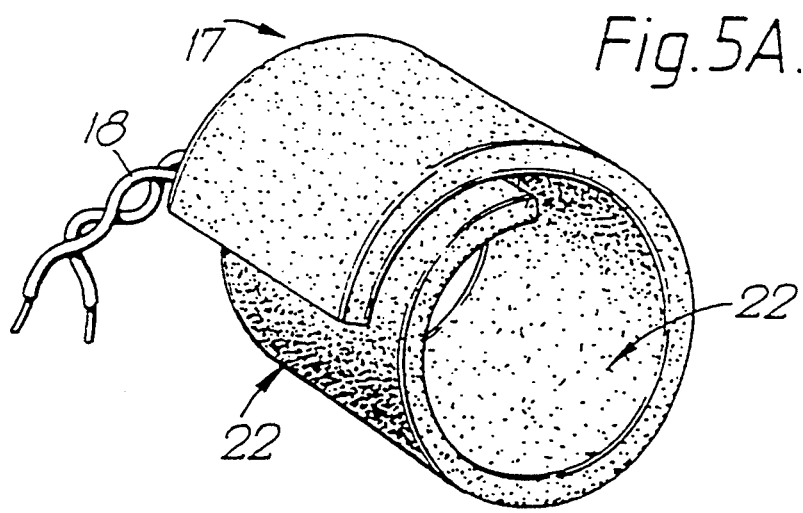
FIGS. 5A, 5B and 5C show a heating tape wrap; and,
 FIGS. 6A, 6B and 6C show switching means included in a battery tape wrap.
Figure 5B:
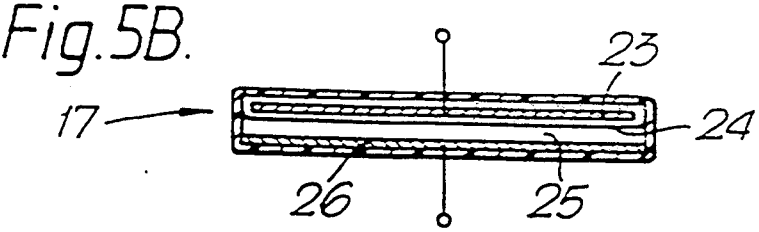
Figure 5C:
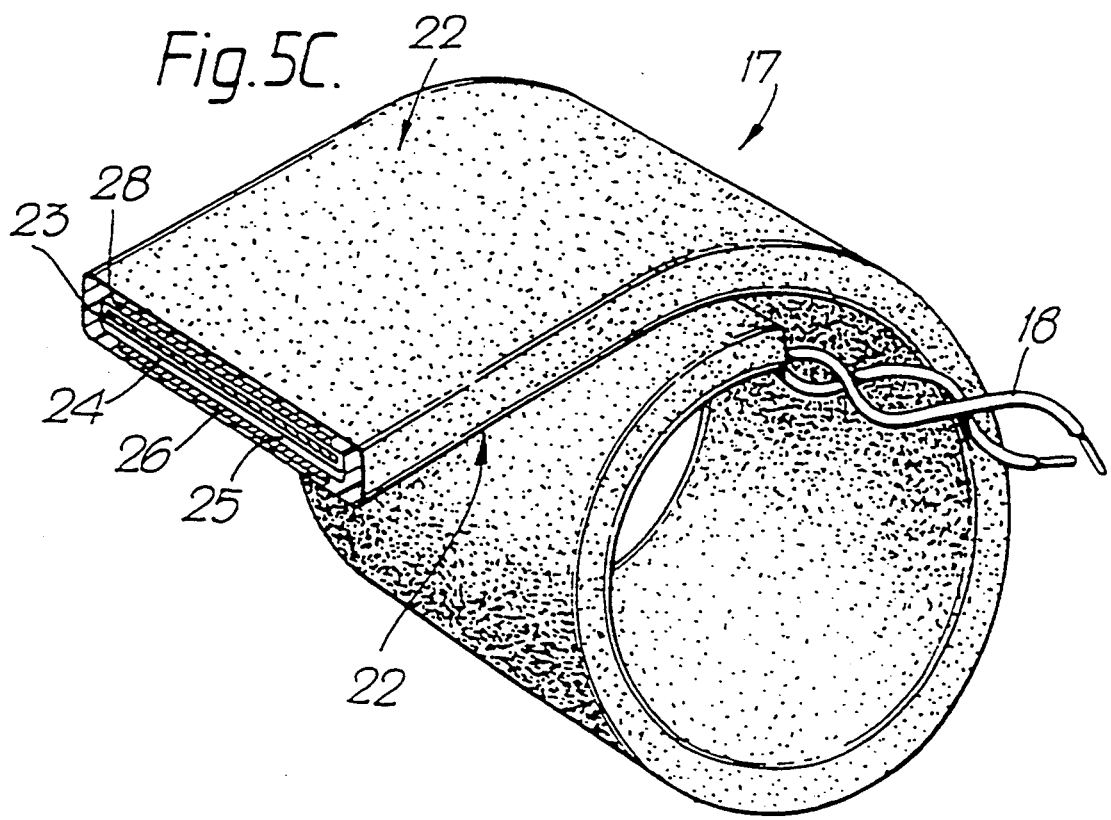

FIGS. 5A, 5B and 5C show a preferred cable wrap employing a lithium battery. A cable wrap may be made having sections such that it can be cut to length in the field. For example it could be produced in-line having sections such that, say, one section was suitable for a cable of about 15 mm diameter and that four sections would be needed for a cable of 80 mm diameter, and 2 or 3 sections be needed for intermediate sizes. The tape could be 20-60 mm, say about 50 mm, wide and each section be about 50-80 mm, say about 70 mm long. The preferred dimensions could result in a heat output of just above 3 watt hours per section.

A tie wrap 17 is shown in FIG. 5A. It is coated with a hot-melt adhesive 22 on each side. Electrical leads 18 are connected to the anode and the cathode of the internal battery, and as a result connection together of leads 18 causes current to flow through the internal resistance of the battery and any other heating element within the wrap. That causes the wrap to become hot and the adhesive 22 to be activated.

A cross-section through the wrap is illustrated in FIG. 5B. One can see a lithium electrode 23, a porous membrane 24, an electrolyte 25, and a magnesium dioxide or other suitable electrode 26.

The tie wrap 17 shown in FIG. 5C also has a PTC heating element 28 connected in series with the lithium battery. Heat is generated at least in part within the element 28 which, due to its PTC behaviour, regulates the heat output of the strip.

The conductors 18 have been connected together as shown at 27 to cause the internal battery 23,24,25,26 to power the internal PTC heating element 28.

Figure 6A:
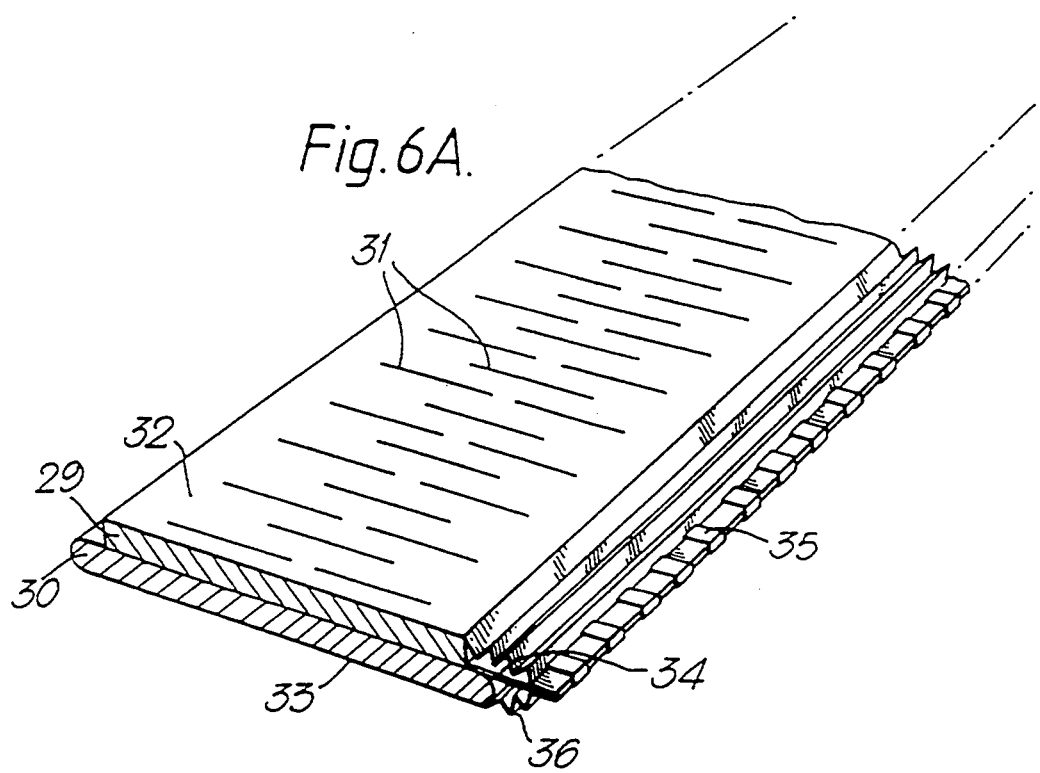
Figure 6B:
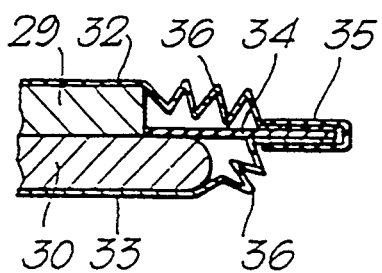
Figure 6C:
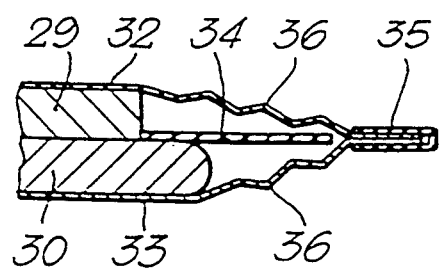

FIGS. 6A, 6B and 6C show a way in which the battery may be electrically connected to a heating element, be it either its own internal resistance or a separate element.

The cable wrap illustrated, in perspective in FIG. 6A and in cross-section in FIGS. 6B and 6C, comprises a PTC heating strip 29 and a lithium battery 30 together with a switching means 34,35,36. Slits or other means 31 may be provided in one or more components to improve flexibility of the strip allowing it to be wrapped around a cable.

An aluminum or other electrode 32,33 is provided on each side of the PTC/battery laminate. When these two electrodes are connected together, an electric circuit is made and current will flow through the PTC strip 29 causing the cable wrap to become hot. At one edge of the strip the two electrodes protrude, and are separated by an insulator 34. An insulating clip 35 retains the electrodes 32,33 close to one another, but on opposite sides of the insulator 34. When the clip is pulled to the right as drawn in FIG. 6B the electrodes move with it to a position away from the insulator 35. In this position, as shown in FIG. 6C, the electrodes can now touch one another, optionally under the influence of the clip 35 which forces them together. The electrodes may be provided with corrugations 36, allowing their extension to the right. Alternatively, the electrodes may remain fixed, and an insulator moved.

For the avoidance of doubt it is here noted that the invention provides a method and articles for environmental protection which allow a high quality seal to be made under a heat-shrinkable sleeve, but avoid the bulk change of dimension usually associated with heat-shrinkable sleeves. Thus the amount of heat required is reduced. Any one or more of the sleeve configurations, heaters, power supplies, switches or sealing materials disclosed may be selected.

I claim:

1. A method of protecting a substrate, which comprises:
    (a) providing an article having a first portion that comprises a heat shrinkable material, said heat shrinkable material additionally having means allowing said first portion to be mechanically deformed from a larger cross-sectional size to a smaller cross-sectional size,
    (b) positioning the article such that said first portion encloses at least a part of the substrate,
    (c) mechanically deforming said first portions to the smaller cross-sectional size at which it corresponds closely to said part of the substrate, and
    (d) subsequently heat-shrinking said heat shrinkable material to cause said first portion to engage said part of the substrate.

2. A method according to claim 1, in which the means allowing deformation comprises corrugations.

3. A method according to claim 2, in which the first portion comprises a sleeve and the corrugations run substantially longitudinally of the sleeve.

4. A method according to claim 1, in which the article comprises a sleeve, and the means allowing deformation allows the formation of a substantially frusto-conical portion at or adjacent one or each end of the sleeve, said substantially frusto-conical portion being formed in step (c).

5. A method according to claim 4, in which the means allowing deformation allows the formation of a substantially frusto-conical portion adjacent one or each end of the sleeve and tapering towards that end and a substantially cylindrical portion between that end and the narrow end of the frustum, said substantially frusto-conical and cylindrical portions being formed in step (c).

6. A method according to claim 1, in which the step (c) results in the first portion having corrugations therein of a certain size.

7. A method according to claim 6, in which step (d) results in at least partial removal of the corrugations.

8. A method according to claim 5, in which step (c) results in the substantially frusto-conical and cylindrical portions having corrugations therein of a certain size, and step (d) results in substantially complete removal of the corrugations from the substantially cylindrical portion.

9. A method according to claim 1, in which a sealing material is positioned before step (c) between the substrate and the first portion.

10. A method according to claim 9, in which the sealing material comprises a hot-melt adhesive.

11. A method according to claim 1, which additionally comprises:
(e) positioning an electrical heater in thermal contact with the heat-shrinkable material and activating the heater to cause the heat-shrinkage.

12. A method according to claim 11, in which the heater is positioned before step (c) between the substrate and the first portion.

13. A method according to claim 11, in which the heater incorporates its own power supply.

14. A method according to claim 13, in which the heater comprises a battery.

15. A method according to claim 14, in which the battery is activated by shorting it across its internal resistance.

16. A method according to claim 15, in which a device having a positive temperature coefficient of resistance is connected in series between the battery and the short and in thermal contact with the battery.

17. A method according to claim 14, in which the battery is activated by connected a resistive heating element across it.

18. A method according to claim 17, in which the element has a positive temperature coefficient of resistance.

19. A method according to claim 18, in which the element comprises a conductive polymer.

20. A method according to claim 11, in which the heater has the form of a tape wrap.

21. A method according to claim 20, in which the tape wrap comprises
(i) the heater
(ii) a sealing material; and
(iii) a control device.

22. A method according to claim 1, which additionally comprises:
(f) enclosing the first portion within a heat-insulator.

23. A method according to claim 22, in which the insulator comprises a foam.

24. A method according to claim 1, in which the substrate comprises a cable.

25. An article suitable for carrying out a method according to claim 3.

* * * * *